Feb. 23, 1971  L. A. B. PILKINGTON ET AL  3,565,597
SEALING CURTAIN
Filed July 7, 1967  3 Sheets-Sheet 1
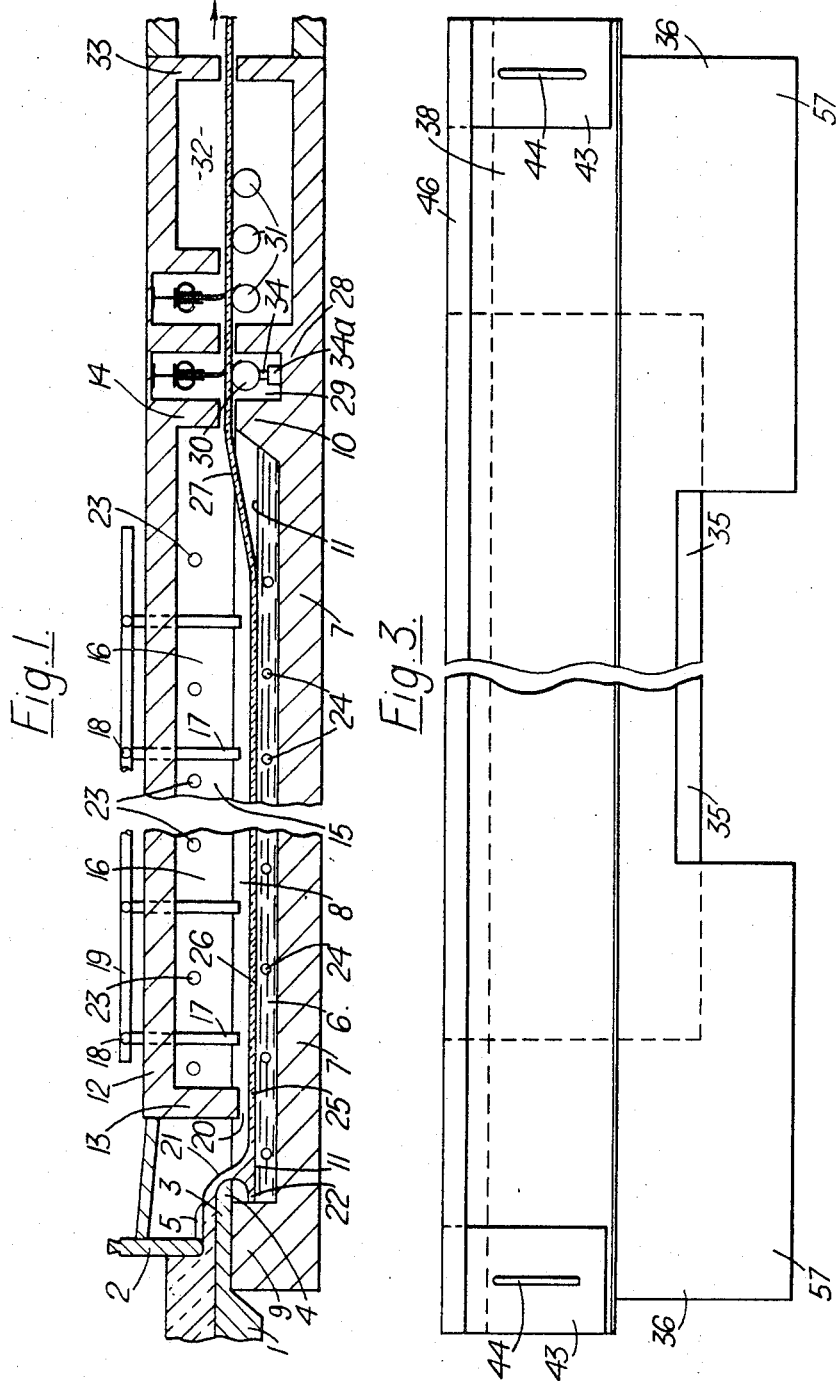
Inventors
Lionel A. B. Pilkington
George A. Dickinson
By Morrison, Kennedy & Campbell
Attorneys

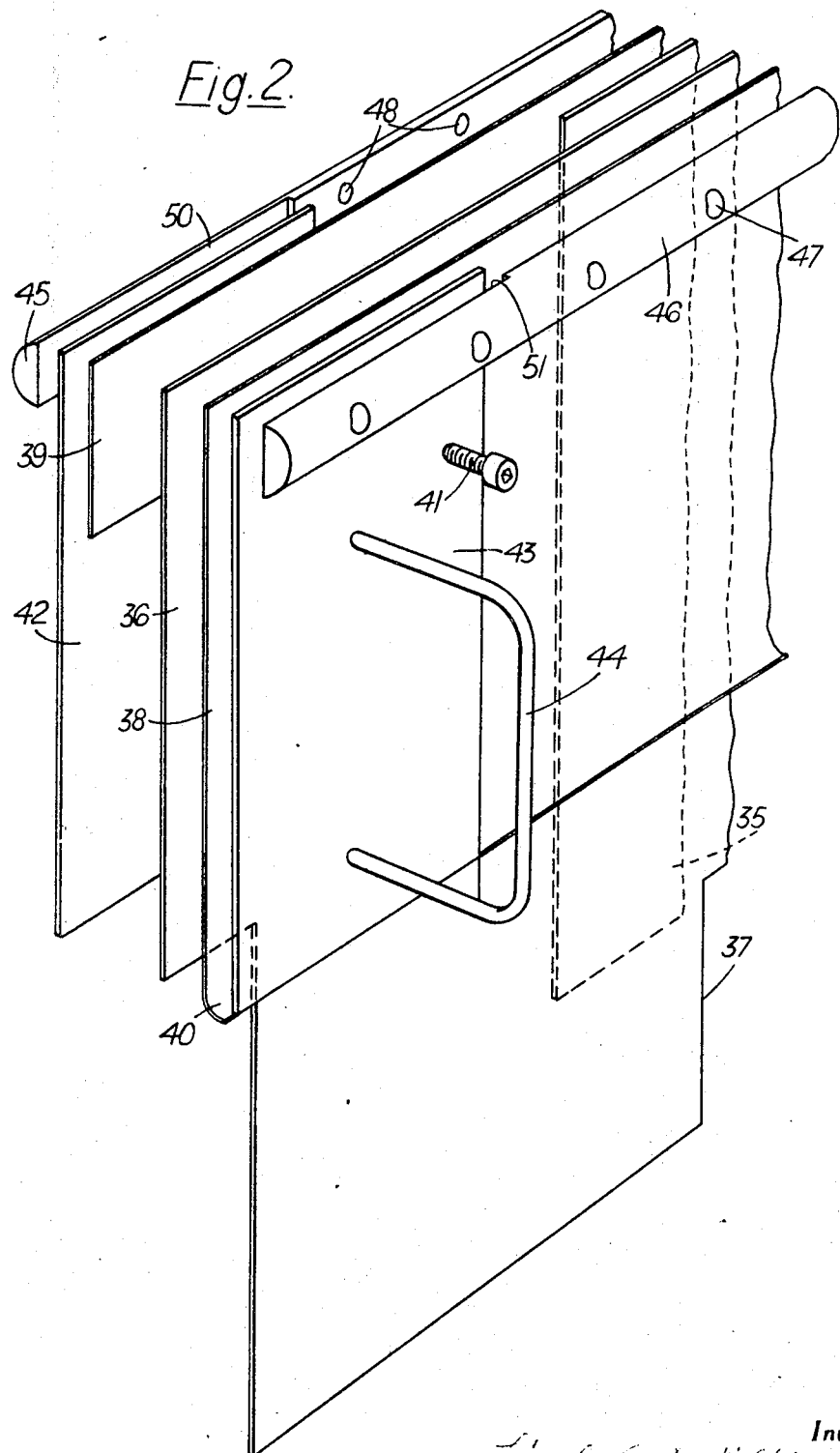

Feb. 23, 1971  L. A. B. PILKINGTON ET AL  3,565,597
SEALING CURTAIN
Filed July 7, 1967  3 Sheets-Sheet 3
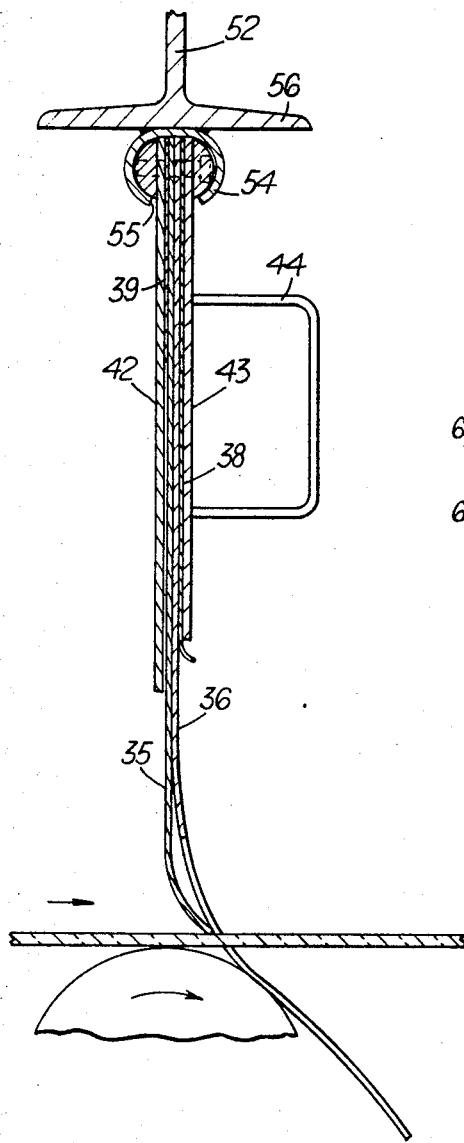
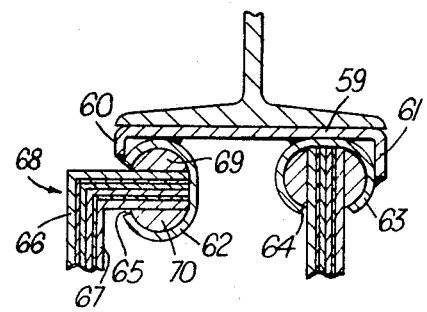
Inventors United States Patent Office 3,565,597
Patented Feb. 23, 1971

3,565,597
SEALING CURTAIN
Lionel Alexander Bethune Pilkington, Rainhill, and George Alfred Dickinson, St. Helens, England, assignors to Pilkington Brothers Limited, Liverpool, Lancashire, England, a corporation of Great Britain
Continuation-in-part of application Ser. No. 547,314, May 3, 1966. This application July 7, 1969, Ser. No. 842,811
Claims priority, application Great Britain, May 10, 1965, 19,614/65
Int. Cl. C03b 18/00
U.S. Cl. 65—182                                                   8 Claims

ABSTRACT OF THE DISCLOSURE

A sealing curtain for draping onto the ribbon of glass in the float process comprises a sheet of heat resistant cloth which does not mark the glass, e.g. woven silica cloth, which is weighted against the glass surface by a backing sheet of asbestos cloth.

CROSS REFERENCES TO RELATED APPLICATIONS

This application is a continuation-in-part of our copending application Ser. No. 547,314 filed May 3, 1966 and now abandoned.

BACKGROUND OF THE INVENTION

This invention relates to the manufacture of flat glass and in particular to apparatus for use in the manufacture of flat glass in ribbon form, comprising a tank structure containing a bath of molten metal along which the glass is advanced. The bath of molten metal is preferably so constituted as to have all the characteristics described in U.S.A. Pat. No. 2,911,759 being a bath of molten tin or of a molten tin alloy having a specific gravity greater than that of molten glass.

The tank structure has an inlet to the bath for glass and an outlet through which glass in ribbon form is discharged from the bath, and a roof structure bridges the tank structure to define a headspace over the bath, in which headspace a protective atmosphere is maintained at a plenum. There is thus an outward flow of protective atmosphere from the headspace through the inlet and outlet, which outward flow minimises the entry of ambient atmosphere into the headspace over the bath. The entry of air, for example, into the headspace could result in reaction of the oxygen in the air with the bath metal, thereby producing contaminants for the glass.

It is a main object of the present invention to provide an improved seal over the top surface of glass in ribbon form as it is advanced from one treatment zone to another.

A further object of the invention is to improve the seal at the outlet end of a bath of molten metal along which glass in ribbon form is advanced, against the entry of ambient atmosphere into the headspace over the bath.

SUMMARY

According to the invention there is provided apparatus for use in the manufacture of flat glass in which glass in ribbon form is advanced from a first zone wherein a given atmospheric pressure is maintained to a second zone wherein a lesser atmospheric pressure is maintained, comprising a curtain providing a seal between the zones, said curtain including a sheet of relatively lightweight heat resistant material supported with a portion near the lower edge thereof draped upon the upper surface of the ribbon and whose lightness is such as not to mar said ribbon surface, and a backing sheet of asbestos cloth supported contiguous to said lightweight material on the side thereof of lesser atmospheric pressure to weight the heat resistant cloth toward the top surface of the glass and restrain said cloth against movement under the pressure in said first zone.

The heat resistant cloth is substantially impervious to gases and must be of a durable fabric. Woven silica cloth is suitable. A glass fibre fabric or carbon cloth may also be used.

The sealing means may be employed at any location where a ribbon of glass is passing from one treatment zone to another, for example from one chamber to another chamber at the entrance to an annealing lehr, or for sealing the opening through which a ribbon of glass is discharged from a tank structure containing a bath of molten metal in the float process for the manufacture of flat glass.

BRIEF DESCRIPTION OF THE DRAWINGS

FIG. 1 is a sectional elevation of apparatus according to the invention showing a tank structure containing a bath of molten metal, a roof structure over the tank structure, and sealing curtains at the outlet end of the tank structure, FIG. 2 is an exploded view of one of the curtains shown in FIG. 1, FIG. 3 is a front elevation of the curtain of FIG. 2, FIG. 4 is a section on line IV—IV of FIG. 3 showing the curtain mounted on a supporting beam, and FIG. 5 is a section through two curtains according to the invention mounted on the same supporting beam.

DESCRIPTION OF THE PREFERRED EMBODIMENTS

Referring to the drawings a forehearth of a continuous glass melting furnace is indicated at 1, a regulating tweel at 2 and a spout at 3. The spout comprises a lip 4 and side jambs 5 which form with the lip a spout of generally rectangular cross-section. A cover is secured over the spout in well-known manner.

The spout is disposed over one end of a tank structure which contains a bath 6 of molten metal, for example molten tin or molten tin alloy having a specific gravity greater than the specific gravity of molten glass. The tank comprises a floor 7, side walls 8, and end walls 9 and 10 respectively at the inlet and outlet ends of the tank. The side walls 8 and the end walls 9 and 10 are integral with each other and with the floor 7. The level of the surface of the bath 6 of molten metal is indicated at 11.

The tank structure supports a roof structure bridging the bath and including a roof 12, an end wall 13 at the inlet end of the bath and an end wall 14 at the outlet end of the bath. The roof structure also includes side walls 15 so that the roof structure provides a tunnel over the bath 6 and defines a headspace 16 over the bath into which headspace a protective atmosphere is fed through ducts 17 which are connected by headers 18 to a main supply conduit 19. The protective atmosphere is maintained at a plenum in the headspace as a protection against the ingress of ambient atmosphere into the headspace over the bath.

The inlet end wall 13 of the roof structure terminates just above the surface level 11 of the molten metal thereby defining an inlet 20 through which molten glass is advanced along the bath of molten metal.

The spout 3 is disposed in overlapping relation with the end wall 9 of the tank structure so that the lip 4 of the spout is disposed over the molten metal and molten glass 21 flowing from the glass melting furnace over the spout 3 is caused to have a free fall of several inches to the level 11 of the bath surface and forms a heel 22 of molten glass under the spout 3.

Temperature regulators 23 are provided in the headspace over the bath and temperature regulators 24 are immersed in the bath to control the temperature of the glass as it is advanced along the bath, and the thermal condition of the glass is such that the layer 25 of molten glass which is established on the bath spreads on the bath surface laterally unhindered to the limit of its free flow as it is advanced, until there is developed on the surface of the bath a buoyant body 26 of molten glass. This buoyant body 26 of molten glass is then advanced in ribbon form along the bath and cooled as it is advanced until the ribbon of glass 27 is sufficiently stiffened to permit it to be taken off the bath surface unharmed and discharged from the tank structure through an outlet from the tank structure defined above the outlet end wall 10.

The outlet end wall 10 of the tank structure is extended as indicated at 28 to define a pit 29 in which is mounted a take-up roller 30. This roller 30 is so mounted in the pit 29 that its top surface is exposed above the level of the top surface of the end wall 10. The cooled stiffened ribbon of glass 27 is taken up off the bath surface by the roller 30 and delivered horizontally onto further conveyor rollers 31 mounted beyond the outlet end of the tank in a chamber 32 defined between the outlet end of the tank and the inlet end wall 33 of an annealing lehr.

A gas seal is provided under the roller 30 by a carbon blade 34 which is housed in a mounting 34a fixed to the floor of the pit 28. The blade 34 is spring urged against the roller 34 thereby providing a seal under the roller.

Because the protective atmosphere in the headspace 16 over the bath is maintained at a plenum there is a flow of protective atmosphere out of the headspace both above and below the ribbon of glass 27 as it is discharged from the bath. The carbon blade 34 bearing on the underside leakage of ambient atmosphere into the headspace over the bath and the invention provides an improved seal of the roller 30 seals the underneath of the ribbon against over the top of the ribbon of glass against ingress of contaminating atmosphere over the top of the ribbon.

Supported from the outlet end wall 14 of the roof structure there is at least one sealing curtain which provides the required seal over the top surface of the ribbon of glass. Two such curtains according to the invention are shown in FIG. 1, but an adequate seal is provided by only one curtain.

Each curtain has the construction shown in greater detail in FIG. 2 which is an exploded view of one sealing curtain according to the invention. Referring to FIG. 2, the curtain includes a sheet 35 of heat resistant cloth, e.g. woven silica cloth, glass fibre cloth or carbon cloth, which is arranged to drape onto the top surface of the ribbon of glass 27 as it is discharged over the outlet end wall 10 of the tank structure.

Preferably the sheet 35 is of woven silica cloth and may, for example, be a material known as "Refrasil" cloth. "Refrasil" is the trademark of a cloth manufactured and sold by The Chemical & Insulating Co. Ltd. of Darlington, England. Standard sizes of such cloth sold by that company range in nominal thickness from 0.015 to 0.036 inch and in nominal weight from 0.67 to 2.0 ozs. per square foot. This cloth has good drape and lightness and when its lower edge just drapes on to the glass ribbon surface as shown in FIG. 1 it will not mar the surface of the ribbon even though the temperature of the latter may be as high as 750° C. Cloth of this light weight however, does not hang quietly in the presence of a normal plenum pressure on the one side and the normal ambient atmospheric pressure on the other with the result that a desired seal will not be maintained in the absence of means for preventing the curtain from blowing in the wind of the atmosphere escaping from the exit end of the bath.

In order to prevent destruction of the seal provided by the proximity of the lower edge of the lightweight curtain with the top surface of the ribbon, a backing sheet 36 of asbestos cloth is mounted behind the woven silica sheet 35 considered in the direction of advance of the ribbon 27, and the asbestos cloth sheet 36 is cut away as shown at 37 (see FIGS. 2 and 3) in the region of the path of the ribbon 27 so that the asbestos sheet 36 weights the silica cloth 35 down towards and on to the top surface of the ribbon of glass.

The sheets of cloth 35 and 36 are sandwiched between clamping plates 38 and 39 of heat resisting steel. The clamping plate 38 behind the asbestos sheet 36 is deeper than the plate 39 which is clamped on the other side of the cloth. The plate 38 forms the bulk of the sealing curtain although it ends some way above the top of the path of the glass so that the seal is continued between the bottom of the steel plate 38 and the top surface of the ribbon of glass 27 by the woven silica cloth 35.

The plates 38 and 39 extend across the whole width of the tank structure and the bottom edge of the plate 38 is bent outwardly to form a curved lip 40 thereby minimising wear on the asbestos cloth 36. The plates 38 and 39 are held together by means of lock screws one of which is shown at 41, which pass through the plate 38, the cloths 35 and 36 and the plate 39, and are set in an adhesive material.

A mild steel end plate 42 is fixed to the plate 39 at each end of the partition, and a corresponding mild steel handle plate 43 is fixed to each end of the clamping plate 38. The handle plates 43 carry handles 44 to facilitate the positioning and adjustment of the curtain.

The clamping of the parts of the curtain together is completed by two half round bars 45 and 46 which have co-operating holes 47 and 48 for receiving clamping bolts 49 (see FIG. 4).

The bars 45 and 46 are recessed as shown at 50 and 51 to fit over the end plates 42 and the handle plates 43 respectively. The bolts holding the two bars together pass right through the bars, the clamping plates and the two cloths.

As shown in FIG. 1 the curtain hangs downwardly from the outlet end wall 14 of the roof structure on the bottom of an I-beam 52 which is fixed into a recess 53 in the bottom of the outlet end wall 14.

The mounting of the curtain on the beam is shown in greater detail in FIG. 4. A slotted tube 54 which has a slot 55 extending along its complete length is welded to the bottom web 56 of the I-beam 52. The slot is positioned at the bottom of the tube 54 so that the two bars 45 and 46 which are clamped to the top of the curtain can be slid into the tube and so supported below the outlet end wall 14 of the roof structure.

The bottom of the curtain defines with the take-up roller 30 an outlet for the ribbon of glass 27 from the bath. This outlet is sealed by the sealing blade 34 under the roller 30, and by the sealing curtain according to the invention, the silica cloth sheet 35 being maintained draped on to the top surface of the ribbon of glass 27 as the ribbon is discharged from the bath. The ends 57 of the asbestos sheet 36 drape over the surface of the roller 30. Protective atmosphere can escape from the headspace 16 under the draped silica cloth 35 and under the ends 57 of the asbestos cloth which together provide an effective seal against the ingress of external atmosphere into the headspace.

The seal may be improved by providing a second sealing curtain as shown in FIG. 1, co-operating with the first conveyor roller 58 in the chamber 32. Further curtains may be provided, for example four sealing curtains according to the invention would provide a labyrinth through which ambient atmosphere could only enter the headspace over the bath with the greatest difficulty.

FIG. 5 illustrates an alternative arrangement for supporting two sealing curtains according to the invention from a single beam fixed into the outlet end wall 14 of the roof structure. A support plate 59 with downwardly extending side flanges 60 and 61 is welded to the bottom web 56 of the beam 52. Two slotted tubes 62 and 63 are welded to the support plate 59, being positioned by the flanges 60 and 61 and the tube 63 has its slot 64 downwardly disposed in the same way as the tube 54 illustrated in FIG. 4. The other tube 62 is so positioned that its slot 65 opens to one side. The curtain mounted in the tube 63 has the same construction as the curtain illustrated in FIG. 4, but the two clamping plates 66 and 67 of the curtain mounted in the tube 62 are each right angled at the top of the plates as indicated at 68 so that the two half round bars 69 and 70 are clamped above and below the top edges of the clamping plates 66 and 67 and the assembled curtain can be slid into the tube 62 with the tops of the clamping plates 66 and 67 projecting horizontally out of the slot 65. This arrangement maintains an adequate spacing between the two sealing curtains which are supported from the same beam fixed into the outlet end wall of the roof structure. Four curtains may be mounted on two beams by duplicating this modified construction shown in FIG. 5.

Although the invention has been described with particular reference to the sealing of the outlet from a tank structure containing a bath of molten metal along which glass in ribbon form is advanced, it will be apparent that a sealing curtain according to the invention may be used inside the tank structure near the outlet end of the tank if so desired. Further the invention may be used at any location where a seal is desired between two treatment zones over the top surface of a hot ribbon of glass being advanced from one zone to the other without marring the top surface of the glass, for example at the inlet to the annealing lehr or indeed inside the annealing lehr to divide the lehr into a number of zones.

We claim:

1. Apparatus for use in the manufacture of flat glass in which glass in ribbon form is advanced from a first zone wherein a given atmospheric pressure is maintained to a second zone wherein a lesser atmospheric pressure is maintained, comprising a curtain providing a seal between the zones, said curtain including a sheet of relatively lightweight heat resistant material supported with a portion near the lower edge thereof draped upon the upper surface of the ribbon and whose lightness is such as not to mar said ribbon surface, and a backing sheet of asbestos cloth supported contiguous to said lightweight material on the side thereof of lesser atmospheric pressure to weight the heat resistant cloth toward the top surface of the glass and restrain said cloth against movement under the pressure in said first zone.

2. Apparatus according to claim 1, wherein the heat resistant cloth is a sheet of woven silica cloth.

3. Apparatus for use in the manufacture of flat glass comprising a tank structure containing a bath of molten metal along which glass is advanced in ribbon form towards an outlet for the glass, a roof structure over the tank structure to define a headspace over the bath, means for maintaining a protective atmosphere at a plenum in said headspace, and a curtain providing a seal for the outlet for the glass ribbon from the bath, said curtain including a lightweight sheet of woven silica cloth supported with its lower edge portion draped upon the upper surface of the ribbon and whose lightness is such as not to mar said ribbon surface, and a backing sheet of asbestos cloth hanging contiguous to and behind the silica cloth, considered in the direction of advance of the glass, the asbestos cloth being cut away in the region of the path of the ribbon so that in use it weights the silica cloth towards the top surface of the glass and restrains said silica cloth against movement by flow of gas escaping from said headspace.

4. Apparatus according to claim 3, including conveyor rolls at the outlet from the bath, which rolls are mounted in an extension of the tank structure, and wherein said curtain is mounted above the conveyor rolls so that the edges of the asbestos sheet hang down onto a roll surface.

5. Apparatus according to claim 3, wherein the sides of the asbestos cloth hang below the level of the path of the ribbon of glass.

6. Apparatus according to claim 1, wherein the sheet of heat resistant material and the backing sheet of asbestos cloth are sandwiched between clamping plates which are held in a mounting with the tops of the sheet clamped together and sufficient depth of the sheets left free to enable the bottom of the heat resistant cloth to drape onto the upper surface of the glass.

7. Apparatus according to claim 6, wherein the mounting for the sheets and the clamping plates is fixed to a beam supported from the roof structure.

8. Apparatus according to claim 1, including a number of said curtains mounted behind each other in the direction of advance of the glass.

References Cited
UNITED STATES PATENTS

| | | | |
|---|---|---|---|
| 3,300,291 | 1/1967 | Misson | 65—25A |
| 3,337,320 | 8/1967 | Dyck | 65—27 |
| 3,351,451 | 11/1967 | Barradell-Smith et al. | 65—182X |
| 3,443,922 | 5/1969 | Settino | 65—182X |

FRANK W. MIGA, Primary Examiner

PO-1050
(5/69)

UNITED STATES PATENT OFFICE
CERTIFICATE OF CORRECTION

Patent No. 3,565,597           Dated February 23, 1971

Inventor(s) Lionel A.B. Pilkington and George A. Dickinson

It is certified that error appears in the above-identified patent and that said Letters Patent are hereby corrected as shown below:

Column 3, line 37 before "leakage" insert:

--of the roller 30 seals the underneath of the ribbon against-- line 39 delete "of the roller 30 seals the underneath of the ribbon against"

Signed and sealed this 25th day of May 1971.

(SEAL)
Attest:

EDWARD M. FLETCHER, JR.
Attesting Officer

WILLIAM E. SCHUYLER, JR
Commissioner of Patents